Dec. 24, 1935.  A. BROADMEYER  2,025,152
INTERLEAVING APPARATUS
Filed June 15, 1931  4 Sheets-Sheet 1

Inventor
Albert Broadmeyer,
By
Attorney

Dec. 24, 1935.  A. BROADMEYER  2,025,152
INTERLEAVING APPARATUS
Filed June 15, 1931  4 Sheets-Sheet 2
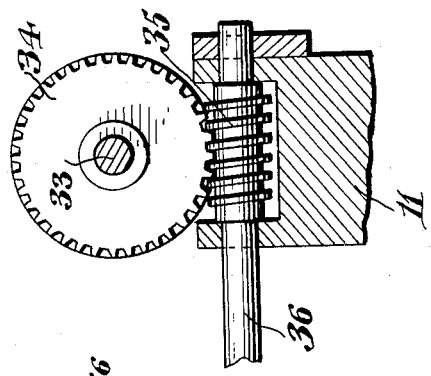
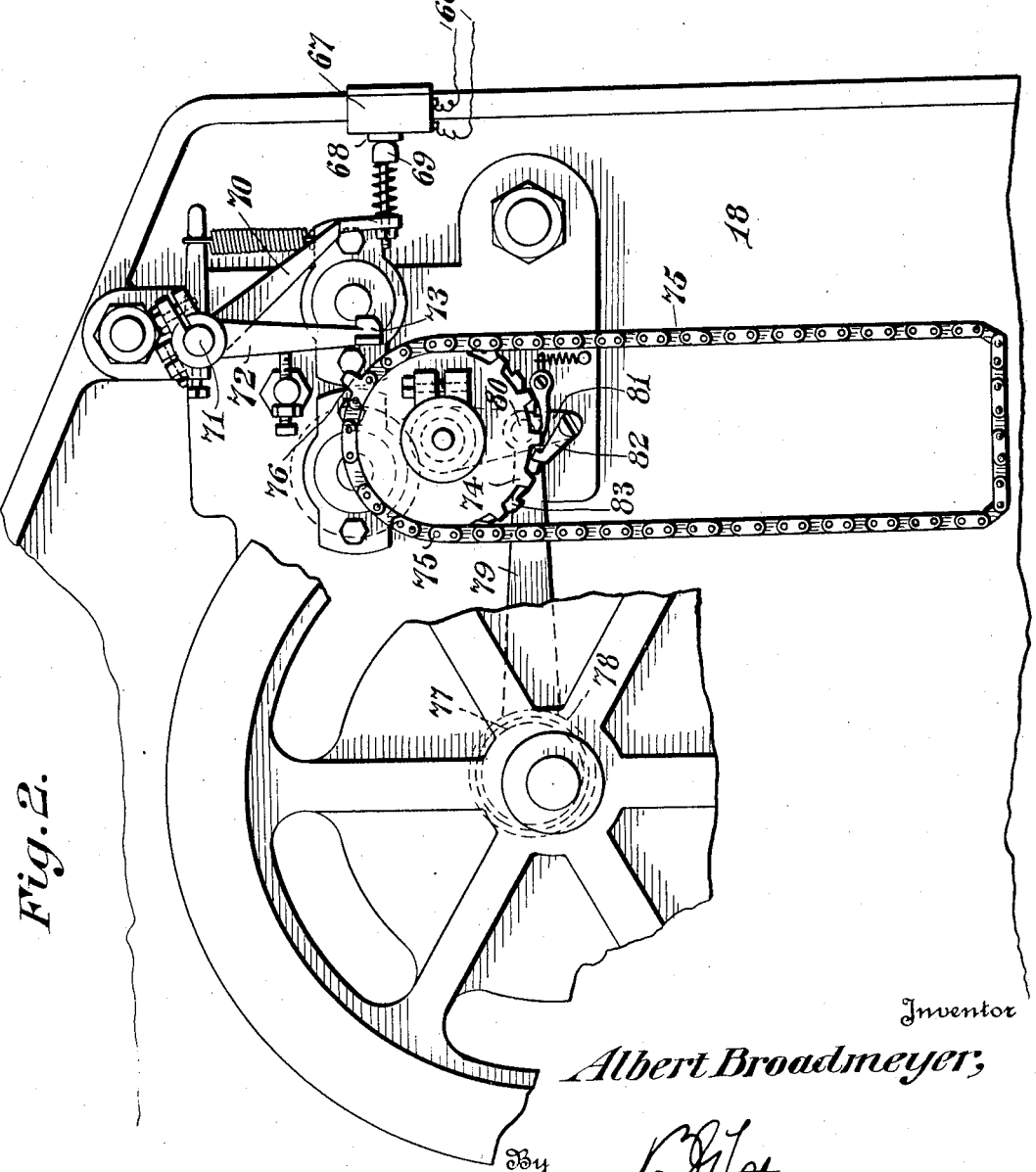
Inventor
*Albert Broadmeyer;*
By
Attorney Dec. 24, 1935. A. BROADMEYER 2,025,152
INTERLEAVING APPARATUS
Filed June 15, 1931   4 Sheets-Sheet 3
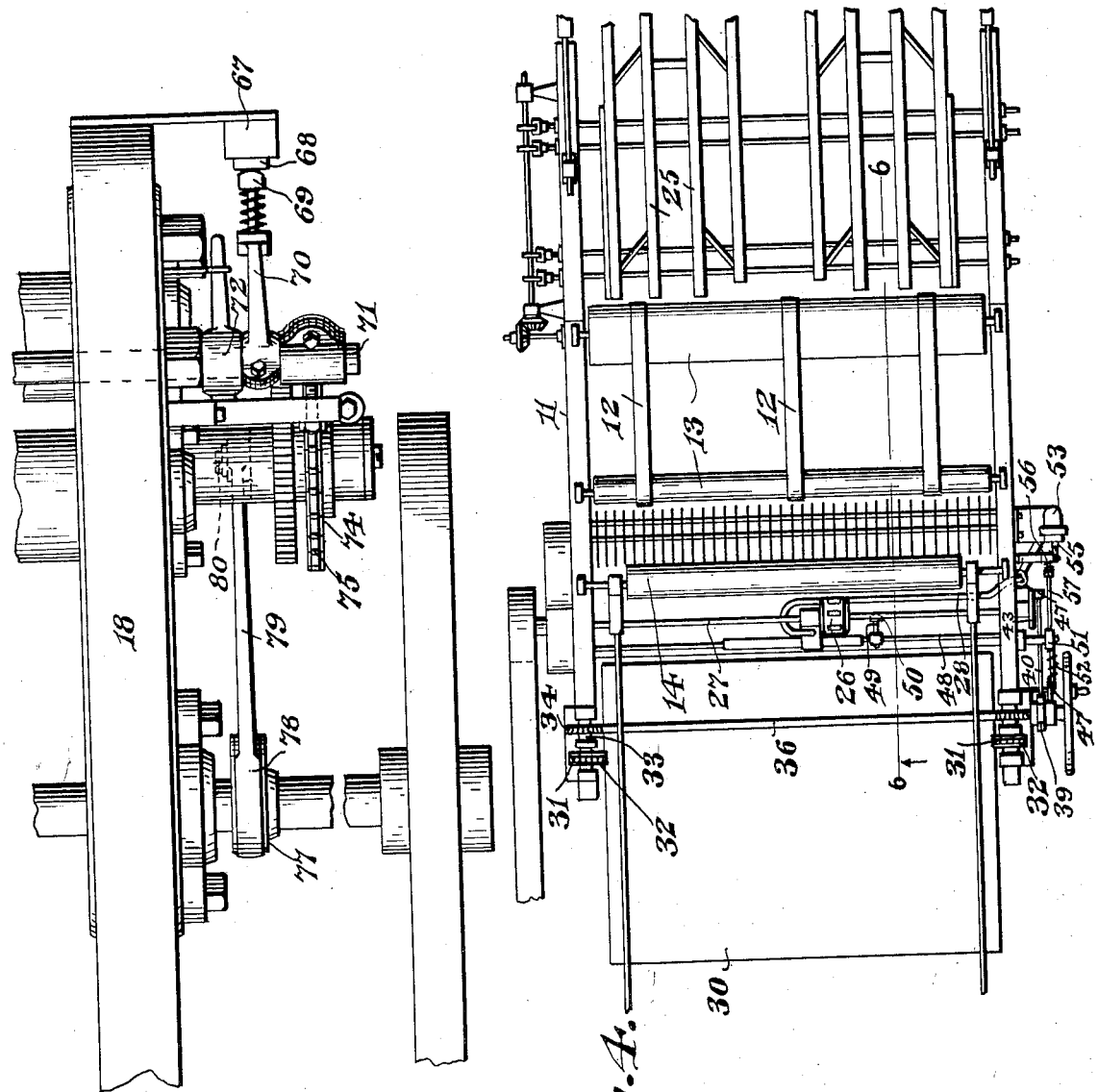
Inventor
Albert Broadmeyer,
By
Attorney Dec. 24, 1935.  A. BROADMEYER  2,025,152
INTERLEAVING APPARATUS
Filed June 15, 1931   4 Sheets-Sheet 4

Inventor
Albert Broadmeyer;
By
Attorney

Patented Dec. 24, 1935

2,025,152

UNITED STATES PATENT OFFICE 2,025,152

INTERLEAVING APPARATUS

Albert Broadmeyer, Harrisburg, Pa., assignor to W. O. Hickok Manufacturing Company, Harrisburg, Pa., a corporation of Pennsylvania Application June 15, 1931, Serial No. 544,582

11 Claims. (Cl. 270—58)

United States Letters Patent No. 1,709,004 granted to me April 16, 1929 discloses and covers an apparatus for piling sheets, and interposing at intervals between a series of sheets of one kind, a sheet of a different character. In the disclosure there is shown a layboy or sheet piling apparatus, a means for conveying sheets thereto, and a plurality of sheet feeding mechanisms that respectively deliver sheets to the conveying means. One of these feeders delivers sheets successively first to a ruling machine, and thence to the conveyor, and this feeder controls the operation of the other feeder, so that when a certain number of sheets has been delivered by the first feeder, the second feeder is caused to operate and deliver a sheet.

In the patented structure, the sheets of the second feeder are delivered by a suction roller, and the suction through this roller is controlled by a valve at the first feeder and operated periodically when a predetermined number of sheets has been delivered by said first feeder. As these machines are lengthy, it has been found that the suction pipe from the first feeder to the second feeder is of such length that when suction is created through the opening of the controlling valve at the first feeder, it does not act in the suction roller of the second feeder with that approximate instantaneity that is desirable, and as a consequence the second feeder lags in its operation with respect to the first feeder.

One of the objects of the present invention is to improve the structure of the controlling mechanism so as to obtain a more instantaneous operation of the second feeder when the governing mechanism controlled by the first feeder is made active.

Another and important object relates to the governing means that controls the presentation of the sheets to the suction roller or other feeding device. As is well known to those skilled in the art, where a body of sheets is maintained in cooperative relation to the delivery member, as the topmost sheets are removed by said member, means are provided for keeping the uppermost or topmost sheets of the body or pile in available condition by moving the body intermittently upward or forward as the sheets are carried away. This governing mechanism includes a feeler that rests against the topmost sheet, or in other words, against the sheet that is to be next removed. With the ordinary flexible paper sheets the delivery device picks up the topmost sheet and carries it from under the feeler, but where the sheets are heavier, as of cardboard, the feeler interferes with the lifting and movment of the topmost sheet since the sheet will not bend readily.

Another and important object of the present invention therefore is to provide a means which will move the feeler so that it will not obstruct or materially interfere with the delivery of the topmost sheet.

In the accompanying drawings:

Figures 1 and 1a together constitute a view in side elevation of an embodiment of the invention which is at present considered the preferable one.

Figure 2 is a detail view in elevation of the controlling mechanism for the second feeder and associated with the first feeder.

Figure 3 is a plan view of the same.

Figure 4 is a top plan view of the second feeder and the layboy or sheet piling mechanism and corresponds substantially to a top plan view of the structure shown in Figure 1a.

Figure 9 is a detail sectional view on the line 9—9 of Figure 6.

Figure 1:
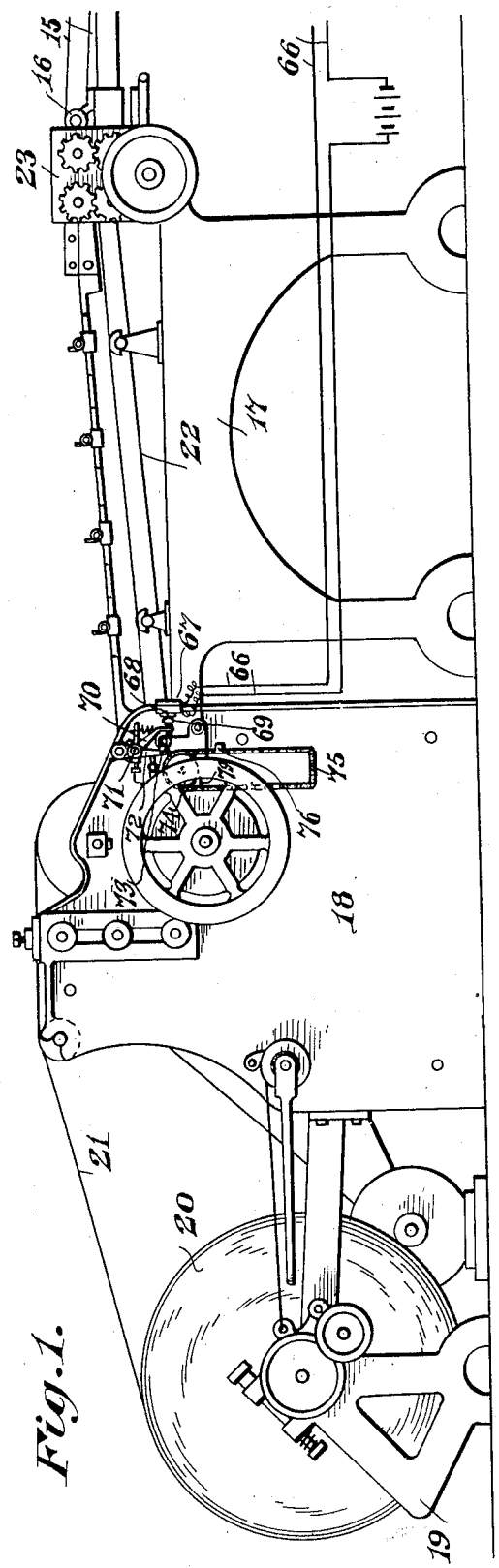
Figure 1A:
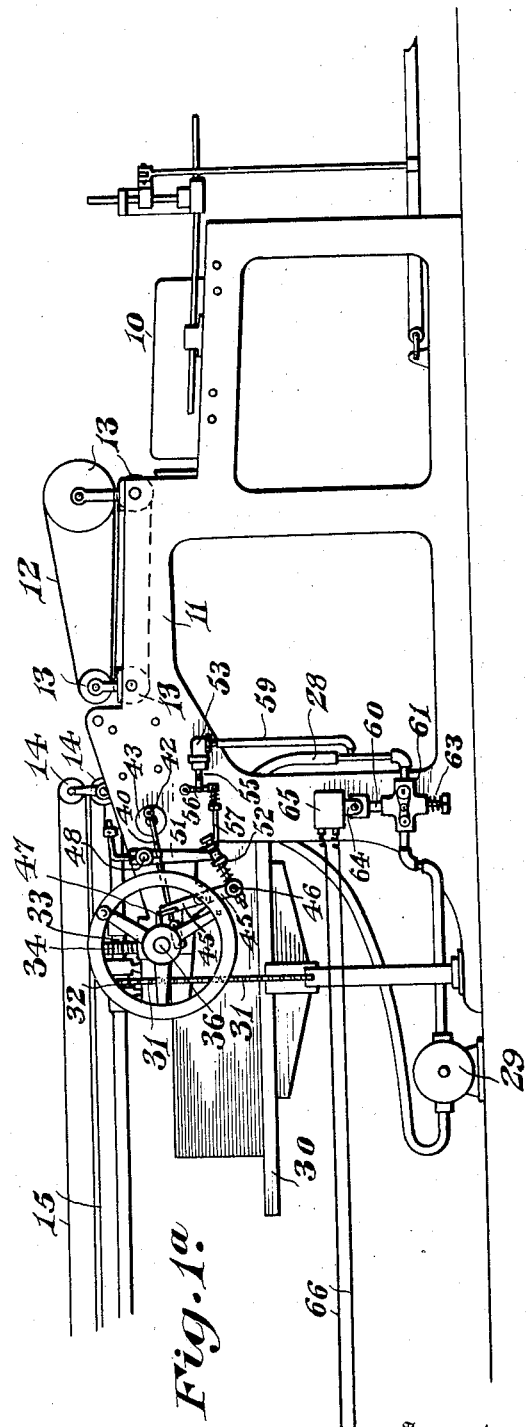

The general plan of the apparatus is the same as that found in my prior Patent No. 1,709,004, and it is believed therefore needs no detail exposition. As shown, a layboy or sheet piling device is illustrated at 10, and may be of any desired or well-known character. This layboy is mounted on the rear portion of a frame 11, in which are upper and lower sets of tapes or endless conveyor cords 12 operating around rollers 13, and having their coacting stretches delivering into the sheet piling mechanism.

Mounted on the frame 11 are rollers 14, around which pass endless conveyor belts 15 that also pass around suitable rollers 16 on the rear portion of a front frame 17. In advance of the frame 17 is another frame 18 having suitable brackets 19 on which a roll of paper, as 20, may be journaled. The web 21 of this roll is carried through suitable mechanism fully disclosed in Patent No. 1,709,004, where it is severed into sheets, and these sheets are carried by a conveyor 22 to disk rulers at 23 on the rear portion of the frame 17. The sheets after passing through the ruling mechanism at 23, are conveyed rearwardly by the belts 15, and are directed between guides 24 and 25

Figure 6:
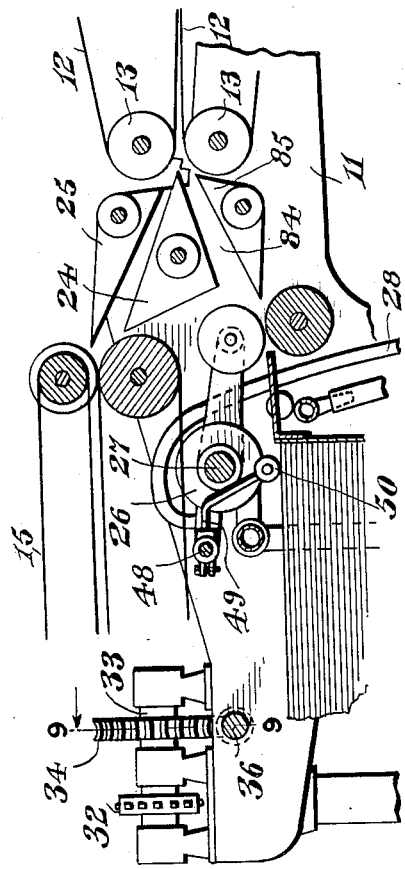
Figure 6 is a detail sectional view on the line 6—6 of Figure 4.
Figure 7:
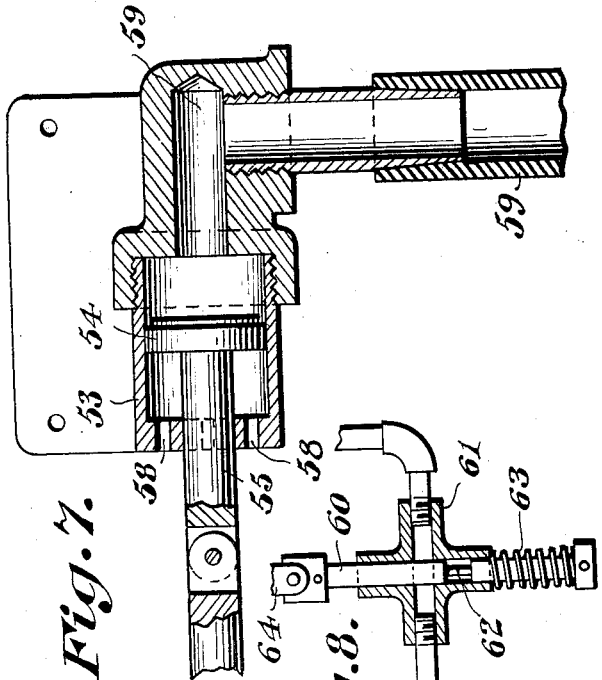
Figure 7 is a detail sectional view through the feeler operating motor.
Figure 5:
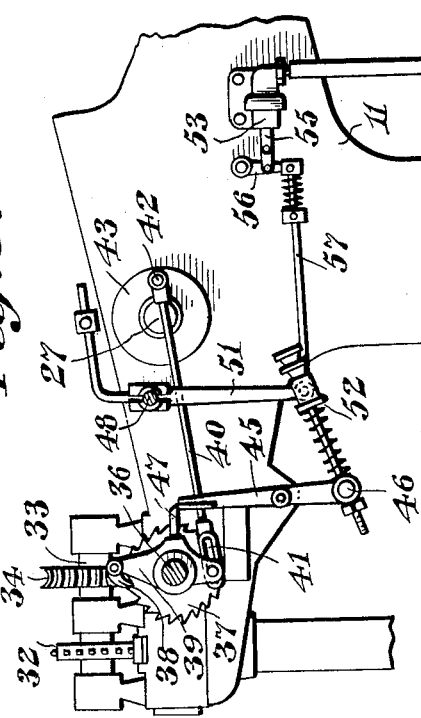
Figure 5 is a detail view in elevation of the control mechanism for the second feeder.
Figure 8:
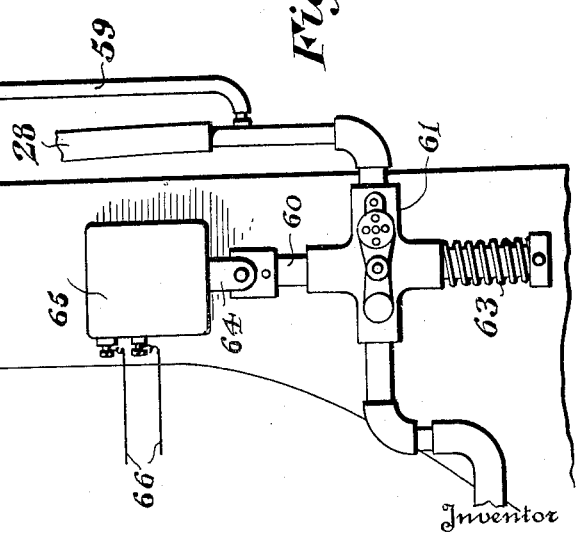
Figure 8 is a detail sectional view of the control valve for the suction roller of the second feeder and the feeler motor.

(see Figure 6) to the conveyor tables 12, which in turn deliver them into the layboy or piling mechanism 10.

At the front end of the frame 11 is a second feeding apparatus. This is in the form of a suction roller 26 that may be of any well-known type, for instance, that shown in the patent granted to me August 26, 1930, No. 1,774,315. This roller is mounted on a continuously rotating shaft 27, and suction is created therein through a conduit 28 leading from a suction pump 29. The sheets to be fed by the suction roller 26 are mounted on a vertically movable table 30 located beneath the roller and supported by chains 31 that pass around sprocket wheels 32 carried by shafts 33 journaled on the frame 11. The shafts have worm wheels 34 in mesh with worms 35 on a cross shaft 36 (see Figure 9).

The shaft 36 is periodically rotated, and to this end it is provided with a ratchet wheel 37 adapted to be operated on by a pawl 38 mounted on a pawl carrier 39 that is journaled on the shaft 36. The pawl carrier is oscillated through the medium of a link 40 having a loose play connection 41 with said pawl carrier, this link 40 being moved back and forth by reason of its crank pin connection 42 with a crank disk 43 on the shaft 27. The oscillatory movement of the pawl carrier 39 is controlled by a detent 45 pivotally mounted, as shown at 46, at its lower end, and having its upper end movable into and out of the path of a stop finger 47 carried by the pawl carrier 39. When the detent 45 is in the path of the stop finger 47, obviously the pawl carrier will not effectively move, but the loose play connection 41 permits the link 40 to play freely. When, however, the detent 45 is out of the path of the stop finger 47, then the pawl carrier can move sufficiently to cause the pawl 38 to pass behind one or more of the teeth of the ratchet wheel 37, after which the pawl carrier will be moved by the link to turn the ratchet wheel, thereby rotating the shaft 36 and effecting the rotation of the shaft 33, with a consequent elevation of the table 30.

The position of the detent 45 is determined by the location of the top of the pile of sheets on the table 30. To this end a rock shaft 48 is provided that extends across the machine, and as shown more particularly in Figures 4 and 6, has a feeler arm 49 provided with a roller or head 50 that rests on the top of the pile. This rock shaft 48 has also fixed thereto an arm 51 having a yielding link connection 52 with the detent 45. The structure is such that when the top of the pile is at the proper elevation, the detent 45 is beneath the stop finger 47 and the pawl carrier cannot effectively operate, but as the top of the pile lowers due to the removal of the topmost sheets by the suction roller 26, the feeler 49 will gradually move downwardly, thereby turning the rock shaft 48, and swinging the arm 51 in a direction to cause the detent 45 to be pulled from beneath the stop finger 47. When out of the path of said stop finger 47, the pawl carrier is able to operate, thereby as above explained elevating the table until the top of the pile again reaches a position to raise the feeler, and through the said mechanism, bringing the detent 45 beneath the stop finger 47. The structure as thus far described, is well-known.

This second feeder is, however, often used for delivering relatively heavy cardboard, and a problem has arisen in connection therewith, for the boards being stiff and the feeler resting on the topmost board or the one that is next to be fed, holds the top sheet so that the suction roller 26 cannot effectively operate upon it. Means are therefore provided for raising the feeler whenever the suction roller acts to remove a sheet. This means is preferably as follows. A motor member is provided consisting of a cylinder 53 in which is a reciprocatory piston 54. The piston is provided with a piston rod 55 connected to a swinging arm 56, and this arm in turn has a link connection 57 with the arm 51. One end of the piston chamber is open to atmosphere through ports 58. The other end of the piston chamber is connected by a branch conduit 59 with the suction conduit 28 that leads to the suction roller 26. As a consequence it will be evident that whenever the suction roller 26 is open to suction from the pump 29, suction will also take place in the branch conduit 59, and the air pressure against the outer side of the piston 54 will cause said piston to move rearwardly, thereby swinging the arm 51 in a corresponding direction and elevating the feeler arm 49 and its head 50 from the top of the pile, so that the feeler is out of the way when suction is taking place through the roller 26, or in other words, when said roller is acting to remove a sheet.

The suction through the roller 26 and in the motor member 53—54 is controlled by a reciprocatory valve 60 located in a valve casing 61 in the conduit 28 below the connection of the branch conduit 59 therewith. This valve, it will be noted, is located at the second feeder, whereas in the structure of Patent 1,709,004, it was located at the first feeder. The valve is of the usual plunger type, including a reduced portion 62 movable into and out of alinement with the passageway through the valve casing and normally being held out of such passageway by a coiled spring 63 on the lower end of the valve. This valve in the present structure is connected with the core 64 of an electro-magnet located in a suitable case 65 mounted above said valve on the frame of the feeder. This electromagnet 65 is in an electric circuit, indicated diagrammatically at 66, and said circuit includes a circuit closer or controller 67 mounted on the frame of the first feeder. The circuit closer includes a suitable push button 68 that is pressed against by a yieldingly mounted head 69 that is carried by a crank arm 70. This crank arm in turn is secured to a rock shaft 71 and said rock shaft has a second crank arm 72 provided with an abutment head 73 on its free end. A sprocket wheel 74 has mounted thereon an endless sprocket chain 75 provided with one or more buttons or lugs 76 that are adapted to engage the head 73 as the chain progresses, thereby pushing the arm 72 to the right (see Figure 2), correspondingly moving the arm 70, and pressing the button 68 inwardly to close the electric circuit 66, as will be clearly understood by those skilled in the art. The sprocket wheel 74 is given a step-by-step movement. Thus in the present embodiment and as disclosed in the aforesaid Patent No. 1,709,004, one of the constantly rotating shafts of the first feeder is provided with an eccentric 77, on which is mounted a ring 78 formed at one end of a link 79. This link is pivotally connected, as indicated at 80, with a pawl carrier 81. A pawl 82, mounted on the carrier 81, operates on the teeth of a ratchet wheel 83 fixed to the sprocket wheel 74. The mechanism is such that as a sheet is delivered from the first feeder, the pawl 82 will operate the ratchet wheel 83 one increment of movement, correspondingly moving the sprocket wheel 74 and sprocket chain 75. Therefore when a predetermined number of sheets has been delivered by the first feeder, the lug 76 of the sprocket chain 75 will engage the head 73 of the arm 72, and effect a closing of the circuit 66. This instantaneously energizes the electro-magnet 65, elevating and thereby opening the valve 60. As a consequence suction takes place in the suction roller 26 and in the cylinder 53. The suction roller therefore becomes active to remove a sheet from the top of the pile, and the feeler being elevated, does not interfere with such removal. The sheet thus taken from the pile is delivered through a passageway 84 formed by the guide 24 and a lower guide 85 and is directed to the tapes 12 which deliver the sheet into the layboy 10.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In apparatus for interleaving sheets, the combination with means for successively conveying sheets, of a plurality of apparatuses for separately delivering sheets to the conveying means, a normally inactive mechanism adjacent to one apparatus for maintaining it inactive, and means adjacent the other apparatus and actuated thereby and having connection with the controlling mechanism for effecting the substantially instantaneous operation of said controlling mechanism to periodically cause the operation of said other apparatus.

2. In apparatus for interleaving sheets, the combination with means for receiving and piling sheets, of means for directing thereto sheets to be piled, a plurality of sheet feeding apparatuses cooperating with the directing means, a normally inactive mechanism adjacent to one apparatus for maintaining it inactive, and means adjacent the other apparatus and actuated thereby and having connection with the controlling mechanism for effecting the substantially instantaneous operation of said controlling mechanism to periodically cause the operation of said other apparatus.

3. In apparatus for interleaving sheets, the combination with a sheet receiving and piling means, of conveyor mechanism for delivering sheets to the piling means, sheet feeding apparatus at different points along the conveyor mechanism for delivering sheets thereto, a normally inactive means for maintaining inactive one feeding apparatus and located adjacent thereto, and means actuated by the other apparatus for instantaneously operating the controlling means to periodically cause the operation of said other apparatus.

4. In apparatus for interleaving sheets, the combination with a sheet receiving and piling means, of conveyor mechanism for delivering sheets to the piling means, sheet feeding apparatuses at different points along the conveyor mechanism for delivering sheets thereto, a normally inactive means for maintaining inactive one feeding apparatus and located adjacent thereto, and means located adjacent to and actuated by the other apparatus and having connection with the said controlling means for instantaneously operating it to effect the operation of the feeding apparatus adjacent to it.

5. In apparatus for interleaving sheets, the combination with means for receiving and piling sheets, of means for directing thereto sheets to be piled, a plurality of sheet feeding apparatuses respectively delivering sheets to the directing means, one of said apparatuses including a suction sheet actuating member, electrically operated means adjacent the suction member for normally preventing the operation of the suction member, an electric circuit including said means, a controller for said circuit, and means operating with the other feeder apparatus for actuating the circuit controller to cause the electrically operated means to effect the operation of the suction means.

6. In apparatus for interleaving sheets, the combination with means for receiving and piling sheets, of means for directing thereto sheets to be piled, a plurality of sheet feeding apparatuses respectively delivering sheets to the directing means, one of said apparatuses including a suction sheet actuating member, an electrically operated valve normally closed to prevent the suction of said member, said valve being adjacent to the suction sheet actuating member, an electric circuit including the valve operating mechanism, a controller in said circuit adjacent the other feeder apparatus, and means operated with said other feeder apparatus for actuating the circuit controller to open the valve and effect the suction action of said sheet actuating member.

7. In apparatus for interleaving sheets, the combination with a sheet receiving and piling mechanism, of a conveyor mechanism for delivering sheets thereto, a feeding apparatus delivering sheets to the conveyor mechanism at one point, a second feeding apparatus for delivering sheets to the conveyor mechanism at another point nearer the receiving and piling mechanism and including a suction sheet operating device, a normally closed valve for controlling the suction in the device, said valve being located adjacent to said device, electrical means for operating the valve to admit suction to the device, a circuit controller at the first feeding apparatus, means for periodically operating the controller and operating with the first feeding apparatus, and a circuit including the controller and valve operating means and effecting the opening of the valve when the controller is operated.

8. In apparatus for interleaving sheets, the combination with a sheet receiving and piling mechanism, of a conveyor system for delivering sheets thereto to be piled, a sheet feeder at one part of the conveyor system for delivering sheets thereto, a second feeder at another part of the conveyor system for delivering other sheets thereto, and including a sheet actuating suction device, a normally closed valve adjacent the second feeder and controlling the suction through the suction device, an electrically operated device for moving the valve to open position, a circuit controller adjacent the first feeder, a circuit including the electrically operated device and the circuit controller, and means operating with the first feeder for periodically actuating the circuit controller to cause the electrically operated device to open the valve.

9. The combination with mechanism for operating successively on sheets and means for conveying sheets to and past the same, of means in advance of said mechanism for feeding sheets successively to the same, a second sheet feeding means at the sheet delivery side of the mechanism for periodically delivering sheets to be interspersed with those that have been operated on by the said mechanism, means at the second feeding means for controlling its operation, and means at the first feeding means and having connections with the controlling means for instantaneously governing the operation of the said controlling means.

10. The combination with mechanism for operating successively on sheets and means for conveying sheets to and past the same, of means in advance of said mechanism for feeding sheets successively to the same, a receiver for the sheets that are carried past said mechanism, a second sheet feeding means behind said operating mechanism for periodically delivering sheets to be interspersed with those in the receiver that have been operated on by the said advance mechanism and carried past the same, means at the second feeding means for controlling its operation, and means at the first feeding means having connections with the controlling means for instantaneously governing the operation of the said controlling means.

11. The combination with mechanism for operating successively on sheets, of means in advance of said mechanism for feeding sheets successively to the same, a receiver for the sheets that pass and have been operated on by said mechanism, a conveyor for conveying the sheets operated on by the mechanism to the receiver, a second normally inactive sheet feeding means behind said operating mechanism for delivering sheets periodically to the conveyor to be carried thereby to the receiver and interspersed with the sheets carried from the said operating mechanism, normally inactive means at the second feeding means for effecting its operation, and governing means for operating said normally inactive means to operate the second feeder, located at the first feeding means and having connections with said controlling means to cause its instantaneous operation.

ALBERT BROADMEYER.